UNITED STATES PATENT OFFICE.

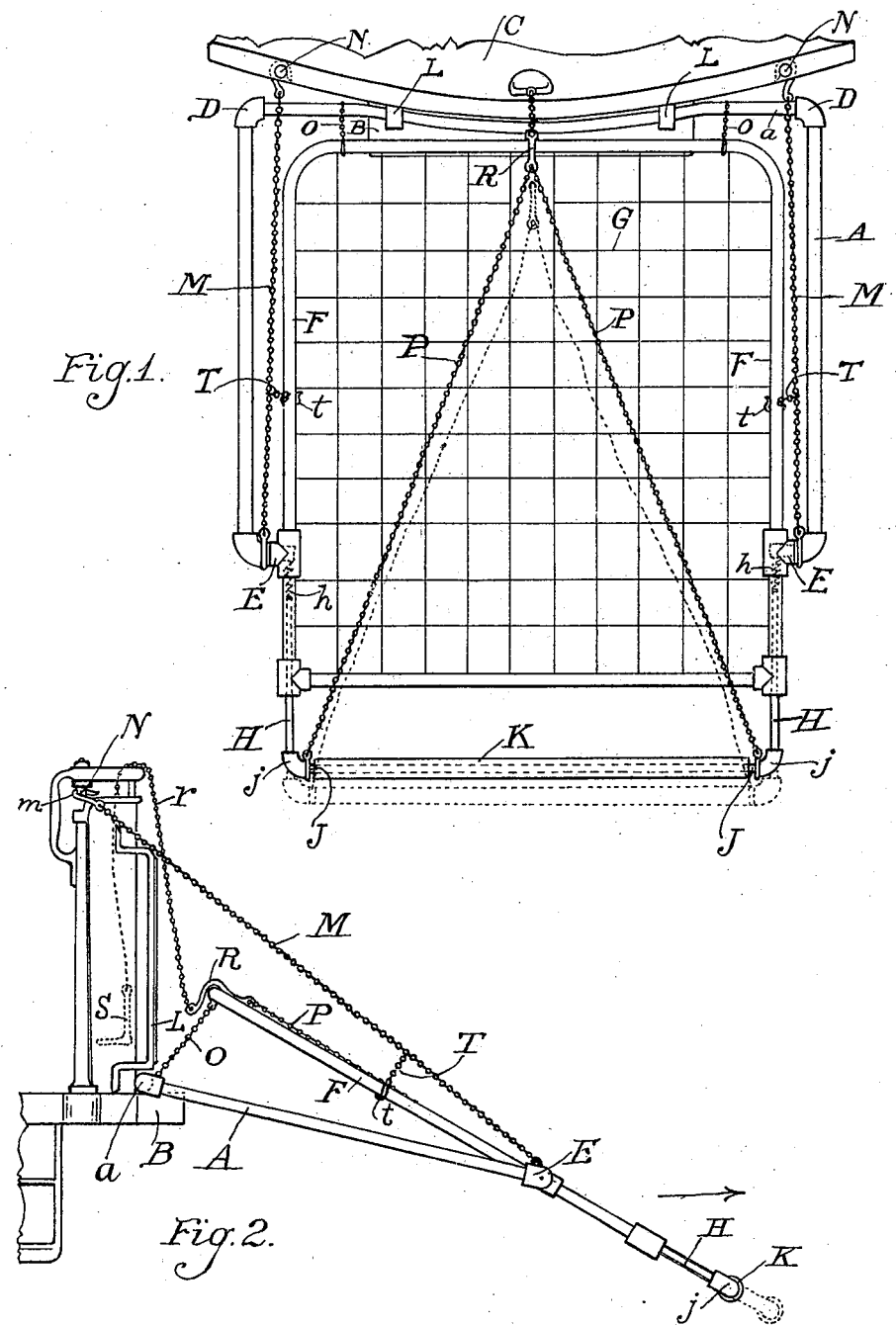

WILLARD SPENCER, OF BATH, NEW YORK, ASSIGNOR OF ONE-HALF TO JAMES A. HOUCK, OF ALBANY, NEW YORK.

STREET-CAR FENDER.

SPECIFICATION forming part of Letters Patent No. 557,161, dated March 31, 1896.

Application filed August 16, 1895. Serial No. 559,531. (No model.)

*To all whom it may concern:*

Be it known that I, WILLARD SPENCER, a citizen of the United States, residing at the village of Bath, county of Rensselaer, and State of New York, have invented a new and useful Improvement in Street-Car Fenders, of which the following is a specification.

My invention relates to devices for preventing street-cars from running over pedestrians; and the object of my invention is to produce a street-car fender which may be readily attached to the platform of a car and transferred from one end of the car to the other when desired, and which is so adjusted that it may be extended downward and forward for the purpose of picking up small obstructions near the track, and which will when receiving the same assume a substantially horizontal position, preventing the obstruction or any part of the fender from dragging on the ground. I attain this object by means of the mechanism illustrated in the accompanying drawings, in which—

Figure 1 is a plan of my invention attached to a car, a portion of the car broken away. Fig. 2 is a side elevation of my invention attached to a car, part of the car broken away.

Similar letters refer to similar parts throughout both views.

I arrange a frame A, constructed preferably of pipe or tubing, having one side $a$ of said frame adapted to conform to the semicircular contour of the dashboard or front platform of the car and to rest upon the bumper B. The sides of the frame A are suitably joined by means of elbows D, and at their ends farthest from the piece $a$ they are connected by means of a swivel T-joint at E to the frame F, which frame F is smaller than frame A in width and extends forward of the frame A, to which it is secured at E. The side pieces of the frame F are usually constructed of piping, to which I secure a net in any suitable manner. The swivel-joint E allows for a movement of the frame F about the connection E as a pivot. Extending into the side pieces of the frame F, I arrange on each side rods H, which are secured at their ends to the rod J, carrying the roller K. Within the side pieces of the frame F near their ends I place springs $h$, resting against the ends of the rods H and suitably supported at the joints E $o$ in any manner, the action of the springs being to project the rods H from the frame F.

As thus arranged, my fender is easily adjusted to the front of a car. The frame A is placed in position, the piece $a$ lying upon the platform in front of the dash, partly resting upon the bumper B, and extending beneath the sign-posts L, which are usually constructed, as shown in Fig. 2, with a space between the floor of the platform and the forward portion of the post, they being usually right-angled near their lower ends. I attach a guy rope or chain M to the joint E on each side, and with the hooks $m$ secure them to the stanchions N of the platform. For the purpose of limiting the movement of the frame F within the frame A, I place the tie-chains O secured to the rear of the frame F and to the piece $a$ of the frame A. As thus arranged, the frame F will in its normal position, the portion forward of the pivot being heavier, lie with its forward lower end slightly above the track, prevented from extending closer to the track by the tie-chain O, and the frame A firmly supported by means of the guy-ropes M.

To the guy-chains M, I attach chains T with hooks $t$ at their ends, adapted to engage with the side pieces of frame F to assist in holding the frame F in position when the vibratory motion of the car causes it to rise and fall and to lessen the force of impact when a body is thrown into the net. The roller K is held in position against the tension of the springs $h$ by the chains or ropes P, which unite and are connected to the hook R, which hook is adapted to rest against and be held in position by the rearward side of the frame F at about midway between the ends of said side. To the lower overlapping end of the hook R, I attach a chain or rope $r$, which may be extended upward over the dashboard and be provided with a stirrup S at its lower end, which may be operated by the motorman, all so adjusted that by pressing downward on the stirrup S the hook R will be brought from contact with the side of the frame F, releasing the ropes P, as shown by dotted lines in Figs. 1 and 2, when the resiliency of the springs $h$ will force forward the rod J and the roller K, which may be so arranged that they will when thus projected reach as near the ground as desired.

The operation of my invention is apparent. When the fender is placed in the position shown by full lines in Figs. 1 and 2, any ordinary obstruction may be picked up, thrown into the fender, and the obstruction upon the net G will cause the frame F to move upon the swivel-joint E, the rearward side of the frame F resting upon the bumper B, and no part of the fender or its contents will come in contact with the ground. The chain T breaks the force of the impact on the net. When the motorman sees an object on the track, he may release the hook R by a movement of his foot, which will project forward the roller K close to the track, when the prostrate object may be thrown into the net, which will immediately assume substantially a horizontal position, as already indicated.

The normal position of the fender being that shown in Fig. 2, the heavier portion of the narrower frame being forward of the pivot causes the fender to assume a tilted position, limited, however, by the chain O, thus holding the fender a slight distance above the track. The portion of the fender in the rear of the pivot is longer, but the rollers and connections forward of the pivot render the forward portion heavier. It is necessary that the forward portion should be heavier in order that gravity shall hold the narrower frame in the tilted position aforesaid, which is necessary in order that my device shall be operative.

The roller K, carried by the rods H H, which project from the sides F F of the frame, is held in its normal position, that shown by full lines in Fig. 2 by the chain P against the tension of the springs $h$ $h$. Thus when the chain P is released the springs $h$ $h$ will force forward and downward the roller K to the position shown by dotted lines in Fig. 2, very near the track. The wider frame is held rigidly in its normal position by the chains M, unaffected by the movement of the tilting frame, the narrower.

It is noticed that the fender as constructed is very light, that it may be readily attached to any car, and transferred from one end of the car to the other without the exertion of much force or skill.

What I claim as my invention, and desire to secure by Letters Patent, is—

1. A detachable car-fender consisting of a frame, one side of which is adapted to rest on the bumper of a car or on the platform forward of the dash, guy-chains extending from said frame to the dash supporting said frame above the track, in combination with a frame of less width carrying a net, said narrower frame extending beyond and placed between the side pieces of said first-mentioned frame, the narrower of said frames held in a tilted position by gravity, a means for holding the narrower of said frames slightly above the track, substantially as described and for the purpose set forth.

2. In a car-fender, two frames, one wider than the other, the adjacent side pieces of said frames pivoted together, one end of the wider of said frames resting upon the bumper or car-platform forward of the dash and detachable therefrom, one end of the narrower of said frames adapted to rest upon the bumper of a car after it has picked up an obstruction and is carrying the same, guy-chains extending from the wider of said frames near the pivotal point to the car stanchions or dash, with tie-chains extending between the ends of said frames, substantially as described and for the purpose set forth.

3. A car-fender consisting of two frames, one pivoted forward of its center on each side to the ends of the other and adapted to oscillate between the sides of the other, the heavier portion of the narrower frame being forward of said pivotal points, the end of one of said frames adapted to rest upon the platform or bumper of a car forward of the dash and detachable therefrom, the end of the other to rest upon the car-bumper when it is carrying an obstruction and when in operation to maintain a tilted position by force of gravity, with a car, guy-chains adapted to support said wider frame to said car, a net attached to the narrower of said frames, a roller mounted upon a rod, rods connecting said roller-carrying rod extending into the side pieces of the narrower frame, springs arranged in contact with said rods adapted to force them forward, with a means for holding said rods against the tension of said springs in such a manner that said springs may be released by the operator of the car when desired, substantially as described and for the purpose set forth.

WILLARD SPENCER.

Witnesses:
FREDERICK W. CAMERON,
MARY M. FLANAGAN.